US010299101B1

(12) United States Patent
Lim et al.

(10) Patent No.: US 10,299,101 B1
(45) Date of Patent: May 21, 2019

(54) DEVICE, SYSTEM AND METHOD FOR CONTROLLING QUALITY OF SERVICE OF COMMUNICATION DEVICES BASED ON A PREDICTED HAZARD PATH

(71) Applicant: MOTOROLA SOLUTIONS, INC., Chicago, IL (US)

(72) Inventors: Bing Qin Lim, Jelutong (MY); Ming Yeh Koh, Bandar Baru Air Itam (MY); Cecilia Liaw Wei Ling, Kajang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/855,176

(22) Filed: Dec. 27, 2017

(51) Int. Cl.
*H04W 4/90* (2018.01)
*G08B 25/00* (2006.01)
*G08B 7/06* (2006.01)
*H04W 4/021* (2018.01)

(52) U.S. Cl.
CPC .............. *H04W 4/90* (2018.02); *G08B 7/066* (2013.01); *G08B 25/005* (2013.01); *H04W 4/021* (2013.01)

(58) Field of Classification Search
CPC ........ H04W 4/90; H04W 4/021; G08B 7/066; G08B 25/005
USPC ...................................................... 455/404.2
See application file for complete search history.

(56) References Cited

U.S. PATENT DOCUMENTS

| 6,973,318 | B2 | 12/2005 | Jambhekar et al. | |
|---|---|---|---|---|
| 7,579,945 | B1 | 8/2009 | Richter et al. | |
| 8,417,533 | B2 | 4/2013 | Clawson | |
| 8,712,686 | B2 * | 4/2014 | Bandyopadhyay | .... G01C 17/38 |
| | | | | 701/446 |
| 9,640,003 | B2 * | 5/2017 | T. .......................... | G07C 9/00111 |
| 9,894,478 | B1 * | 2/2018 | DeLuca ................ | H04W 4/022 |
| 2004/0236547 | A1 * | 11/2004 | Rappaport ............ | G06F 17/509 |
| | | | | 703/2 |
| 2007/0008104 | A1 * | 1/2007 | McBain ................. | G08B 23/00 |
| | | | | 340/517 |
| 2008/0258880 | A1 * | 10/2008 | Smith .................... | G08B 21/10 |
| | | | | 340/286.02 |
| 2009/0054029 | A1 | 2/2009 | Hogberg et al. | |
| 2014/0092753 | A1 | 4/2014 | Vasseur et al. | |
| 2015/0015401 | A1 | 1/2015 | Wedig et al. | |

(Continued)

FOREIGN PATENT DOCUMENTS

WO    WO 2015/147670 A1 *  3/2014  .............. H04W 4/90

*Primary Examiner* — Mong-Thuy T Tran
(74) *Attorney, Agent, or Firm* — Perry + Currier, Inc.

(57) ABSTRACT

A device, system and method for controlling quality of service of communication devices based on a predicted hazard path is provided. From an initial location of a hazard in a building and an electronic representation of the building, a predicted hazard path through the building is determined, as well as geofences, each associated with a respective weight. Geofences that include the predicted hazard path have a higher weight than geofences that exclude the predicted hazard path. Respective network quality of service for communication devices is controlled based on their locations in the building, relative to the geofences, such that a first communication device located in a first geofence that includes the predicted hazard path receives better network quality of service than a second communication device located in a second geofence that excludes the predicted hazard path, the second geofence having a lower weight than the first geofence.

20 Claims, 10 Drawing Sheets

(56) References Cited

U.S. PATENT DOCUMENTS

| | | | | |
|---|---|---|---|---|
| 2016/0027292 A1* | 1/2016 | Kerning | ................ | H04W 4/90 |
| | | | | 455/404.2 |
| 2016/0100301 A1* | 4/2016 | Gaurav | ................ | H04W 4/90 |
| | | | | 455/404.2 |
| 2017/0006449 A1* | 1/2017 | Igumnov | .............. | H04W 4/029 |
| 2018/0032071 A1* | 2/2018 | Wieneke | ............ | G05D 1/0027 |
| 2018/0365354 A1* | 12/2018 | Braghin | ............ | G06F 3/04817 |

* cited by examiner

DEVICE, SYSTEM AND METHOD FOR CONTROLLING QUALITY OF SERVICE OF COMMUNICATION DEVICES BASED ON A PREDICTED HAZARD PATH

BACKGROUND OF THE INVENTION

During a hazard incident, due to heavy wireless communication traffic, there may be wireless traffic congestion that might cause a communication device in the hazard incident to lose a connection and/or have poor connectivity, which may lead to a person operating the communication device to be placed in danger.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
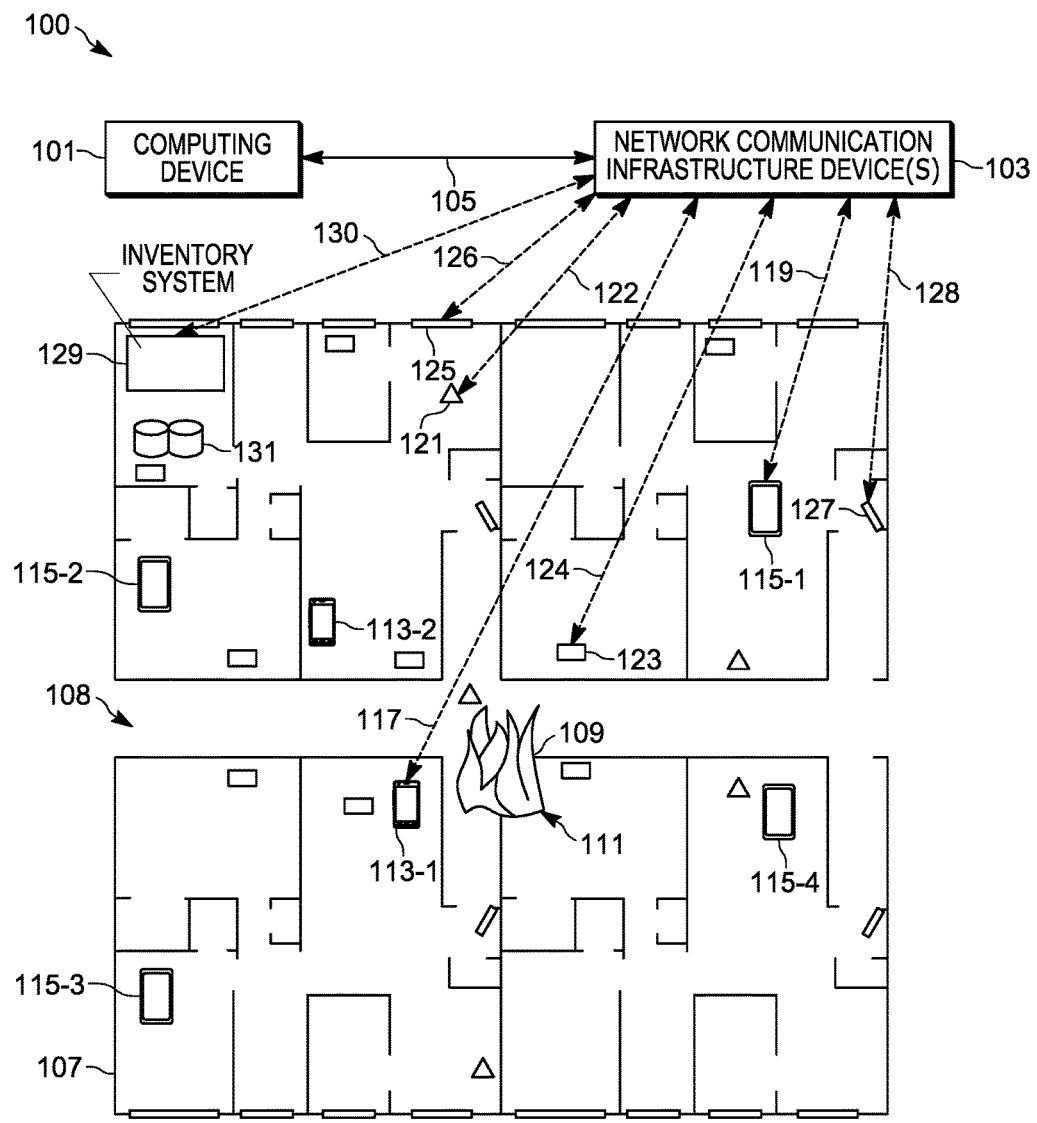
FIG. 1 is a system that includes a computing device for controlling quality of service of communication devices based on a predicted hazard path in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

During a hazard incident, due to heavy wireless communication traffic, there may be wireless traffic congestion that might cause a communication device in the hazard incident to lose a connection and/or have poor connectivity, which may lead to a person at the scene of the hazard incident, who is operating the communication device, to be placed in danger. For example, communication devices in the path of a fire in a building may be at risk of losing connectivity and/or may be at greater risk of being trapped in the building. Their situation may become worse when connectivity and/or power is lost due to communication infrastructure in the building being damaged by the fire. Furthermore, communication devices of firefighters who enter the building may suffer traffic congestion, for example when all the firefighters simultaneously use a push-to-talk feature at their communication devices, with firefighters in the fire path being placed at higher risk due to such traffic congestion.

An aspect of the specification provides a method comprising: determining, at a controller of a computing device, an initial location of a hazard in a building associated with a hazard incident; determining, at the controller, from the initial location of the hazard in the building and an electronic representation of the building, a predicted hazard path through the building from the initial location; determining, at the controller, a plurality of geofences in the building based on the predicted hazard path, each of the plurality of geofences associated with a respective weight, wherein the geofences that include the predicted hazard path have a higher weight than the geofences that exclude the predicted hazard path; determining, at the controller, locations of a plurality of communication devices in the building; and, controlling, by the controller communicating with at least one network communication infrastructure device, respective network quality of service for the plurality of communication devices based on the locations of the plurality of communication devices in the building, relative to the plurality of geofences, such that a first communication device located in a first geofence that includes the predicted hazard path receives better network quality of service than a second communication device located in a second geofence that excludes the predicted hazard path, the second geofence having a lower weight than the first geofence.

Another aspect of the specification provides a device comprising: a controller, and a communication interface configured to communicate with at least one network communication infrastructure device, the controller configured to: determine an initial location of a hazard in a building associated with a hazard incident; determine, from the initial location of the hazard in the building and an electronic representation of the building, a predicted hazard path through the building from the initial location; determine a plurality of geofences in the building based on the predicted hazard path, each of the plurality of geofences associated with a respective weight, wherein the geofences that include the predicted hazard path have a higher weight than the geofences that exclude the predicted hazard path; determine locations of a plurality of communication devices in the building; and, control, via the communication interface communicating with the at least one network communication infrastructure device, respective network quality of service for the plurality of communication devices based on the locations of the plurality of communication devices in the building, relative to the plurality of geofences, such that a first communication device located in a first geofence that includes the predicted hazard path receives better network quality of service than a second communication device located in a second geofence that excludes the predicted hazard path, the second geofence having a lower weight than the first geofence.

Attention is directed to FIG. 1, which depicts a schematic view of a system 100 that includes a computing device 101 in communication with at least one network communication infrastructure device 103 (interchangeably referred to hereafter as the infrastructure device 103) via at least one communication link 105. The system 100 further includes a building 107 at which a hazard is occurring; in the depicted example, the hazard comprises a fire 109 located at an initial location 111 in the building 107.

While the building 107 is depicted schematically, for example as single-story building, the building 107 is appreciated to be a physical building that may include more than one story. Furthermore, the building 107 may comprise one or more of a residential building, a commercial building, an industrial building, and the like. Furthermore, the building 107 may comprise a special purpose building, such as an oil rig and the like; hence the building 107 may be located in an urban environment, a commercial environment, an industrial environment, on land, or located at sea (e.g. in the case of an oil rig, and the like). The building 107 may generally comprise rooms, windows, doors, hallways, passageways, stairwells, bathrooms, kitchens, storage areas, and the like. Such features may be used by persons in the building 107 to escape from the hazard, and/or may be used by the hazard to spread.

As depicted, the building 107 comprises a central passageway 108 and four units, each of which having a respective exit (described below) and windows.

While present embodiments will be described with respect to the hazard being the fire 109, the hazard may include, but is not limited to, one or more of: a fire hazard; a chemical hazard; a biological hazard; a radiological hazard; a nuclear hazard; an environmental hazard; and a terrorist hazard.

It will be further assumed that the computing device 101 is managed by a public service entity, and the like, and is generally configured to provide assistance to communication devices in the building 107 during a hazard, such as the fire 109. Such a public service entity may include, but is not limited to, a firefighting services entity, a police services entity, an emergency medical services entity, an emergency management agency, and/or a combination thereof, and the like. Alternatively, and/or in addition to, the computing device 101 may be managed by a service provider, such as a telephone service provider, a cell phone service provider, and the like. The at least one infrastructure device 103 may be managed by one or more of the public service entity, the telephone service provider, and the like, and is generally configured to control network quality of service to devices in the building 107, for example under control of the computing device 101.

The system 100 further includes a plurality of communication devices 113-1, 113-2, 115-1, 115-2, 115-3, 115-4 within the building 107. In the example of FIG. 1, it will be assumed that the communication devices 113-1, 113-2 are associated with (e.g. being operated by) first responders, such as firefighters, police officers, emergency medical personnel, and the like, deployed to the building to address the hazard, and specifically the fire 109; in the example of FIG. 1, it will be further assumed that the communication devices 115-1, 115-2, 115-3, 115-4 are associated with (e.g. being operated by) people who may live and/or work in the building 107. The plurality of communication devices 113-1, 113-2 will be interchangeably referred hereafter, collectively, as the devices 113 and, generically, as a device 113; similarly, the plurality of communication devices 115-1, 115-2, 115-3, 115-4 will be interchangeably referred hereafter, collectively, as the devices 115 and, generically, as a device 115.

The devices 113 are generally in communication with the infrastructure device 103 via respective communication links 117, and the devices 115 are generally in communication with the infrastructure device 103 via respective communication links 119. For clarity, in FIG. 1, only one link 117 is depicted between the device 113-1 and the infrastructure device 103, but it is assumed that all the devices 113 are in communication with the infrastructure device 103 via a respective link 117; similarly, for clarity, in FIG. 1, only one link 119 is depicted between the device 115-1 and the infrastructure device 103, but it is assumed that all the devices 115 are in communication with the infrastructure device 103 via a respective link 119.

Furthermore, as will be described below, while only one infrastructure device 103 is depicted, the at least one infrastructure device 103 may comprise a first infrastructure device configured to control network quality of service for the devices 113 associated with first responders, and at least a second infrastructure device configured to control network quality of service for the devices 115 associated with persons that are not first responders (i.e. members of the public). Indeed, the system 100 may include a respective infrastructure device for each set of the devices 115 that are receiving service from a given telephone service provider (e.g. at least one infrastructure device for each telephone service provider).

While only two devices 113 are depicted, the system 100 may include any number of devices 113, depending on how many first responders have been deployed to the building 107 to address the hazard, each operating a device 113. Similarly, only four devices 115 are depicted, the system 100 may include any number of devices 115, depending on how many persons are located in the building 107, each operating a device 115.

Each of the devices 113, 115 may comprise a mobile communication device (as depicted), including, but not limited to, any suitable combination of radio devices, electronic devices, communication devices, computing devices, portable electronic devices, mobile computing devices, portable computing devices, tablet computing devices, telephones, PDAs (personal digital assistants), cellphones, smartphones, e-readers, mobile camera devices and the like.

In some embodiments, the devices 113 are specifically adapted for emergency service radio functionality, and the like, used by emergency responders and/or emergency responders, including, but not limited to, police service responders, fire service responders, emergency medical service responders, and the like. In some of these embodiments, the devices 113 further include other types of hardware for emergency service radio functionality, including, but not limited to, push-to-talk ("PTT") functionality. Indeed, the devices 113 may be configured to wirelessly communicate over communication channels which may include, but are not limited to, one or more of wireless channels, cell-phone channels, cellular network channels, packet-based channels, analog network channels, Voice-Over-Internet ("VoIP"), push-to-talk channels and the like, and/or a combination.

Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

The devices 113, 115 may further include additional or alternative components related to, for example, telephony, messaging, entertainment, and/or any other components that may be used with computing devices and/or communication devices.

Each of the devices 115 may comprise a mobile communication device (as depicted) similar to the devices 113, however adapted for use as a consumer device and/or business device, and the like.

Furthermore, it will be assumed herein that each of the devices 113, 115 comprise a respective location determining device, such as a global positioning system (GPS) device, an indoor location tracking devices (e.g. inertia sensors, motion sensors, triangulation devices, etc.) device and the like; hence, each of the devices 113, 115 are assumed to be configured to determine their respective location and furthermore transmit and/or report their respective location to the computing device 101, for example via respective links 117, 119, the infrastructure device 103, and the link 105.

It is furthermore assumed that each of the devices 113, 115 have registered with the computing device 101. For example, the devices 113 associated with responders may have been deployed to the responders by the public service entity managing the computing device 101, and hence the devices 113 are registered with the computing device 113 as each are associated with, and/or managed by the public service entity.

The devices 115 may have each registered with the public service entity using an application and/or website, and the like, for example to allow the public service entity access to their location, at least when located in the building 107, and to give permission to the public service entity to control network quality of service to the devices 115, at least when located in the building 107 and when a hazard is reported in the building 107. In other words, each of the devices 115 have registered with the public service entity, and have given permission to the public service entity to provide assistance to the devices 115 during an emergency, such as the fire 109 and/or other hazards.

It is similarly assumed that an entity managing the building 107 has registered the building 107 with the public service entity, and provided permission to the public service entity to assist devices 115 in the building 107 during a hazard, presuming those devices 115 have also provided permission to the public service entity to provide assistance during an emergency, such as the fire 109 and/or other hazards. Indeed, in some embodiments, a plurality of entities has registered a plurality of buildings with the public service entity, such that the devices 115, when registered with the public service entity received assistance in an emergency when located in any of the buildings registered with the public service entity.

In the depicted example, the building 107 comprises a communication infrastructure, in the form of one or more base stations 121, for example WiFi base stations, cell phone repeaters, and the like, in communication with the infrastructure device 103 via respective links 122; while only one base station 121 and one link 122 are indicated, the building 107 may comprise a plurality of base stations 121. One or more of the devices 113, 115 may communicate with one or more base stations 121, for example to provide assistance to the devices 113, 115 in accessing the internet, and the like, and/or to provide assistance to the devices 113, 115, and/or the computing device 101, in determining locations of the devices 113, 115. In other words, the links 117, 119 may include one or more of the links 122.

However, the communication infrastructure of the building 107 may further include wiring, wiring conduits, etc.

The communication infrastructure, including, but not limited to, the one or more base stations 121, may assist the computing device 101 with determining a hazard path through the building 107 and/or determining an escape path through the building 107. For example, whether or not one or more base stations 121 are communicating may indicate the absence, or presence, of a hazard at a respective location of one or more base stations 121, and/or one or more of the base stations 121 may assist the computing device 101 in determining a location of one or more of the devices 113, 115 using, for example triangulation techniques. Hence, one or more base stations 121 may transmit data indicative of a respective state (e.g. whether the one or more base stations 121 are operational; identifiers of devices 113, 115 with which the one or more base stations 121 are communicating, etc.) to the computing device 101 via a respective link 122, the infrastructure device 103, and the link 105, periodically and/or on demand from the computing device 101.

In the depicted example, the building 107 further comprises one or more sensors 123 in communication with the at least one infrastructure device via respective links 124 (e.g. wired links, wireless WiFi links, cell phone links, and the like). The one or more sensors 123 are configured to sense a hazard in the building 107; the one or more sensors 123 may comprise one or more of a fire sensor, a heat sensor, an infrared sensor, a smoke sensor, a motion sensor, a Light Detection and Ranging (LIDAR) sensor, a chemical sensor, a radiation sensor, a biological species sensor (e.g. configured to detect biological hazards such as viruses, and the like), a moisture sensor, a video sensor, and audio sensor and the like. One or more of the sensors 123 may further be located at an exterior of the building 107 and may be configured to sense weather, wind direction, and the like.

In some embodiments, the building 107, as depicted comprises a plurality of sensors 123 and/or a grid of sensors 123, such that hazard path through the building 107 may be tracked. For example, as the fire 109 travels through the building 107, a plurality of the sensors 123 may detect heat, infrared, smoke, and the like, and sensor data from a plurality of the sensors 123, while operational, are transmitted to the computing device 101 via the links 124 and the at least one infrastructure device 103; such sensor data may enable the computing device 101 to determine the initial location 111 of the fire 109, and the path of the fire 109 as it travels through the building 107.

Hence, the one or more sensors 123 may transmit sensor data indicative of detection of a hazard to the computing device 101 via a respective link 124, the infrastructure device 103, and the link 105, periodically and/or on demand from the computing device 101. Such sensor data may include, but is not limited to, temperature data, heat data, gas data, ventilation data, weather data, wind flow data, smoke data, fire location data, fire severity data (e.g. a temperature of a fire indicating severity), hazard location data, hazard severity data, video data and audio data.

In the depicted example, the building 107 further comprises a smart structure infrastructure, including, but not limited to, one or more smart windows 125 (in communication with the at least one infrastructure device 103 and via respective links 126), one or more smart doors 127 (in communication with the at least one infrastructure device via respective links 128), each of which are configured to generate respective smart sensor data indicative of a state of the smart windows 125 and/or the smart doors 127 to the computing device 101 via respective links 126, 128 and the at least one infrastructure device 103. As depicted, each unit in the building 107 includes a respective smart door 127, which provides a respective exit from each unit.

Smart sensor data may indicate whether a respective smart window 125 or a respective smart door 127 is open, closed, locked, and the like. Such smart sensor data, in combination with locations of the smart windows 125 and/or smart doors 127, may assist the computing device 101 in determining a hazard path through the building 107, as well as an escape path through the building 107.

Hence, the one or more smart windows 125 and/or the one or more smart doors 127 may transmit smart sensor data indicative of a respective state to the computing device 101 via a respective link 126, 128 the infrastructure device 103, and the link 105, periodically and/or on demand from the computing device 101.

As depicted, the building 107 further includes an inventory system 129, in communication with the at least one infrastructure device 103 via a link 130. The inventory system 129 is generally configured to track inventory and/or a location of such inventory in the building 107, for example, hazardous and/or explosive materials 131. The inventory system 129 is further configured to report a presence and location of such explosive materials 131 to the computing device 101 via the link 130, the at least one infrastructure device 103 and the link 105, periodically and/or on demand from the computing device 101.

In general, the computing device 101 has been provided access to the one or more base stations 121, the one or more sensors 123, the one or more smart windows 125, the one or more smart doors 127, and the inventory system 129 by an entity managing the building 107, for example when the building 107 is registered with a public service entity managing the computing device 101.

Figure 2:
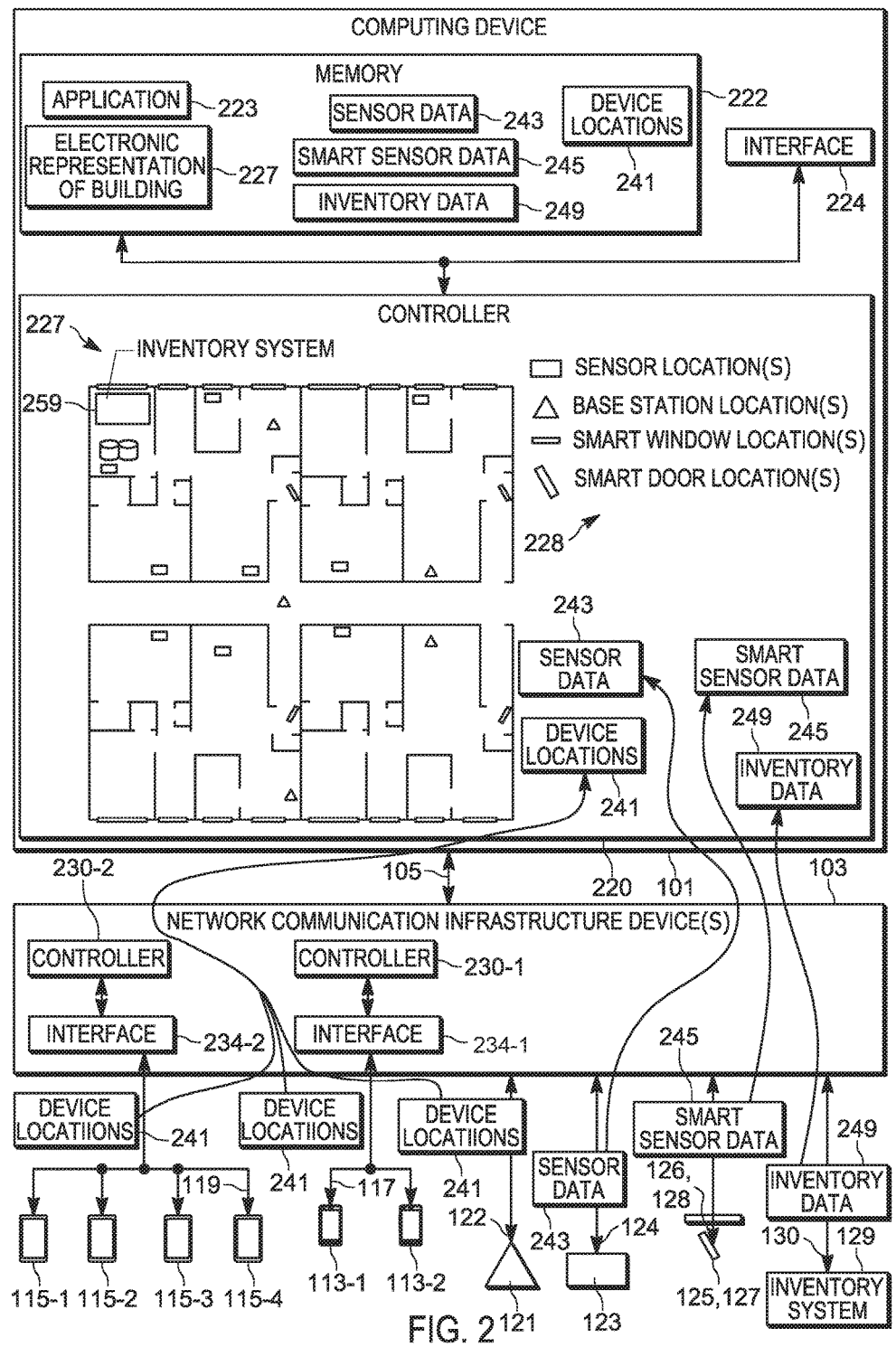
FIG. 2 is a schematic block diagram of the system of FIG. 1, including the computing device for controlling quality of service of communication devices based on a predicted hazard path in accordance with some embodiments.

Attention is next directed to FIG. 2 which depicts a block diagram of the electronic components of the system 100. The computing device 101 includes: a controller 220, a memory 222 storing an application 223, and a communication interface 224 (interchangeably referred to hereafter as the interface 224).

As depicted, the computing device 101 generally comprises one or more of a server, a public safety server, a dispatch server, a computer aided dispatch server and the like. While not depicted, the computing device 101 may be in communication with one or more dispatch terminals and/or a 911 call center, and the like.

The controller 220 includes one or more logic circuits configured to implement functionality for controlling quality of service of communication devices based on a predicted hazard path. Example logic circuits include one or more processors, one or more electronic processors, one or more microprocessors, one or more ASIC (application-specific integrated circuits) and one or more FPGA (field-programmable gate arrays). In some embodiments, the controller 220 and/or the computing device 101 is not a generic controller and/or a generic computing device, but a computing device specifically configured to implement functionality for controlling quality of service of communication devices based on a predicted hazard path. For example, in some embodiments, the computing device 101 and/or the controller 220 specifically comprises a computer executable engine configured to implement specific functionality for controlling quality of service of communication devices based on a predicted hazard path.

The memory 222 of FIG. 2 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the computing device 101 as described herein are maintained, persistently, at the memory 222 and used by the controller 220 which makes appropriate utilization of volatile storage during the execution of such programming instructions.

As depicted, the memory 222 further stores an electronic representation 227 of the building 107, interchangeably referred to hereafter as the representation 227. For example, the representation 227 may comprise one or more of an electronic model, electronic blueprints, electronic drawings, and the like, representative of the building 107. The representation 227 may be two-dimensional (e.g. floorplans) or three-dimensional. The representation 227 may be provisioned at the computing device 101 when the building 107 is registered at the computing device 101 by the entity managing the building 107.

Furthermore, as depicted, the controller 220 has retrieved the representation 227 of the building 107 from the memory 222. While the representation 227 depicted in FIG. 2 appears similar to the building 107 depicted in FIG. 1, the representation 227 comprises data representative of the building 107, while the building 107 schematically depicted in FIG. 1 is an overview of the physical building.

In particular, the representation 227 comprises structural information and/or architectural information of the building 107, which may include, but is not limited to a building type and/or a building structure type (e.g. commercial, residential, or a combination), building unit types (e.g. whether a unit is a business unit, a residential unit, a storage unit (such as an explosive material storage unit)), building material types and associated locations, and the like.

Hence, for example, the representation 227 comprises data indicative of locations of walls, doors, windows, passageways, entrances, exits, bathrooms, kitchens, stairwells, conduits, vents, and/or any other type of physical feature of the building 107, and which may include materials thereof. As depicted, the representations 227 further comprises locations of each of base stations 121, sensors 123, smart windows 125, smart doors 127, and the like, as represented by physical shapes; for clarity, the representation 227 is depicted with a guide 228 indicating the physical shapes that correspond to each of base stations 121, sensors 123, smart windows 125, smart doors 127, and the like, as located in the representation 227. Such locations may be reported to the computing device 101 by the respective base stations 121, sensors 123, smart windows 125, smart doors 127, and the like, and/or provisioned at the representation 227 as they are installed in the building 107.

As depicted, the representation 227 further, and optionally includes a location 259 of the inventory system 129 in the building 107.

The memory 222 of FIG. 2 stores instructions corresponding to the application 223 that, when executed by the controller 220, enables the controller 220 to: determine an initial location 111 of a hazard (e.g. the fire 109) in a building 107 associated with a hazard incident; determine from the initial location 111 of the hazard in the building 107 and the electronic representation 227 of the building 107, a predicted hazard path through the building 107 from the initial location 111; determine a plurality of geofences in the building 107 based on the predicted hazard path, each of the plurality of geofences associated with a respective weight, wherein the geofences that include the predicted hazard path have a higher weight than the geofences that exclude the predicted hazard path; determine locations of a plurality of communication devices 113, 115 in the building 107, relative to the plurality of geofences; and, control, by the controller 220 communicating with at least one network communication infrastructure device 103, respective network quality of service for the plurality of communication devices 113, 115 based on the locations of the plurality of communication devices 113, 115 in the building 107, relative to the plurality of geofences, such that a first communication device 113, 115 located in a first geofence that includes the predicted hazard path receives better network quality of service than a second communication device 113, 115 located in a second geofence that excludes the predicted hazard path, the second geofence having a lower weight than the first geofence.

The interface 224 is generally configured to communicate with the devices 113, 115, the one or more base stations 121, the one or more sensors 123, the one or more smart windows 125, the one or more smart doors 127 and the inventory system 129, via the infrastructure device 103 and the link 105, using wired and/or wireless communication links, as desired, including, but not limited to, cables, WiFi links and the like. In other words, the link 105 may comprise one or more wired links, one or more wireless links, and the like.

The interface 224 may be implemented by, for example, one or more radios and/or connectors and/or network adaptors, configured to communicate wirelessly, with network architecture that is used to implement one or more communication links and/or communication channels between the computing device 101 and the devices 113, 115, the one or more base stations 121, the one or more sensors 123, the one or more smart windows 125, the one or more smart doors 127 and the inventory system 129, via the infrastructure device 103 and the link 105.

The interface 224 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a Worldwide Interoperability for Microwave Access (WiMAX) transceiver operating in accordance with an IEEE 802.16 standard, and/or other similar type of wireless transceiver configurable to communicate via a wireless network for infrastructure communications.

In yet further embodiments, the interface 224 may include one or more local area network or personal area network transceivers operating in accordance with an IEEE 802.11 standard (e.g., 802.11a, 802.11b, 802.11g), or a Bluetooth™ transceiver (e.g. operating in accordance with an IEEE 802.15 standard) which may be used to communicate with the devices 113, 115, the one or more base stations 121, the one or more sensors 123, the one or more smart windows 125, the one or more smart doors 127 and the inventory system 129, via the infrastructure device 103 and the link 105. In some embodiments, the interface 224 is further configured to communicate "radio-to-radio" on some communication channels (e.g. in embodiments where the interface 224 includes a radio), for example with the devices 113, while other communication channels are configured to use wireless network infrastructure.

Example communication channels over which the interface 224 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination.

However, in other embodiments, the interface 224 communicates with the devices 113, 115, the one or more base stations 121, the one or more sensors 123, the one or more smart windows 125, the one or more smart doors 127 and the inventory system 129, via the infrastructure device 103 and the link 105 using other servers and/or communication devices and/or network infrastructure devices, for example by communicating with the other servers and/or communication devices and/or network infrastructure devices using, for example, packet-based and/or internet protocol communications, and the like, and the other servers and/or communication devices and/or network infrastructure devices use radio communications to wirelessly communicate with the devices 113, 115, the one or more base stations 121, the one or more sensors 123, the one or more smart windows 125, the one or more smart doors 127 and the inventory system 129, via the infrastructure device 103 and the link 105. In other words, the links 105, 117, 119, 122, 124, 126, 128, 130 may include other servers and/or communication devices and/or network infrastructure devices.

Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like. Indeed, groups of channels may be logically organized into talkgroups, though channels in a talkgroup may be dynamic as the traffic (e.g. communications) in a talkgroup may increase or decrease, and channels assigned to the talkgroup may be adjusted accordingly.

In any event, it should be understood that a wide variety of configurations for the computing device 101 are within the scope of present embodiments.

Components of at least one infrastructure device 103 are also depicted in FIG. 2. the at least one infrastructure device 103 may include, but is not limited to, one or more of: first responder network communication infrastructure devices; Project 25 network communication infrastructure devices; cell phone network communication infrastructure devices; LTE network communication devices; WiFi network communication infrastructure devices, and the like.

Either way, the at least one infrastructure device 103 is generally configured to control quality of service to each of the devices 113, 115, including, but not limited to, bandwidth, data communications, voice communications, an uplink rate, a downlink rate, a presence update rate, and/or any other quality of service parameter. Such controlling of quality of service may occur by the at least one infrastructure device 103 modifying one or more of an application layer parameter (e.g. the presence update rate) and a transport layer parameter (e.g. the uplink rate and/or the bandwidth) of the devices 113,115.

Indeed, the at least one infrastructure device 103 may control network quality of service to the devices 113 of responders in a different manner than network quality of service is controlled to the devices 115 of non-responders. As depicted, the at least one infrastructure device 103 hence comprises, in an example embodiment, a controller 230-1 configured to control network quality of service of the devices 113 via a communication interface 234-1, and a controller 230-2 configured to control network quality of service of the devices 115 via a communication interface 234-2. The controllers 230-1, 230-2 will be interchangeably referred to hereafter, collectively, as the controllers 230 and, generically, as a controller 230; similarly, the respective communication interfaces 234-1, 234-2 will be interchangeably referred to hereafter, collectively, as the interfaces 234 and, generically, as an interface 234.

While the controllers 230 and the interfaces 234 are depicted as separate, in other embodiments the controllers 230 may be combined into one controller and/or the interfaces 234 may be combined into one interface 234.

However, as depicted, the controller 230-1 and the interface 234-1 may be components of a public service network infrastructure device configured to control network quality of services of the devices 113 on the links 117, while the controller 230-2 and the interface 234-2 may be components of a commercial service provider network infrastructure device configured to control network quality of services of the devices 115 on the links 119.

Such control of quality of service by the controllers 230 occur upon receipt of control communications from the computing device 101 via the link 105.

The controllers 230 and the interfaces 234 are otherwise respectively similar to the controller 220 and the interface 224 adapted, however, for the functionality of the at least one infrastructure device 103. While not depicted, the at least one infrastructure device 103 may further comprise one or more memories, similar to the memory 222, that stores one or more applications for controlling network quality of services for the devices 113, 115 upon receipt of control instructions from the computing device 101.

In yet further embodiments, the computing device 101 and one or more of the controllers 230 and interfaces 234 of the at least one infrastructure device 103 may be combined.

With further reference to FIG. 2, the at least one infrastructure device 103 is in communication with the devices 113, 115 via the links 117, 119, and in communication with the one or more base stations 121, the one or more sensors 123, the one or more smart windows 125, the one or more smart doors 127 and the inventory system 129 via respective links 122, 124, 126, 128, 130.

Furthermore, as depicted, the devices 113, 115 are transmitting data indicative of their respective device locations 241 to the computing device 101 via the at least one infrastructure device 103, the one or more base stations 121 are optionally transmitting similar data indicative of device locations 241 of any of the devices 113, 115 with which the one or more base stations 121 are communicating.

Similarly, the one or more sensors 123 are transmitting sensor data 243 to the computing device 101 via the at least one infrastructure device 103, the one or more smart windows 125 and/or the one or more smart doors 127 are transmitting smart sensor data 245 the computing device 101 via the at least one infrastructure device 103, and the inventory system 129 is transmitting inventory data 249 to the computing device 101 via the at least one infrastructure device 103. As depicted, the controller 220 stores the device locations 241, the sensor data 243, the smart sensor data 245 and the inventory data 249 in the memory 222. Furthermore, the sensor data 243 is received with an identifier of a respective sensor 123 such that a location of a sensor 123 from which specific sensor data 243 is received can be determined.

Figure 3:
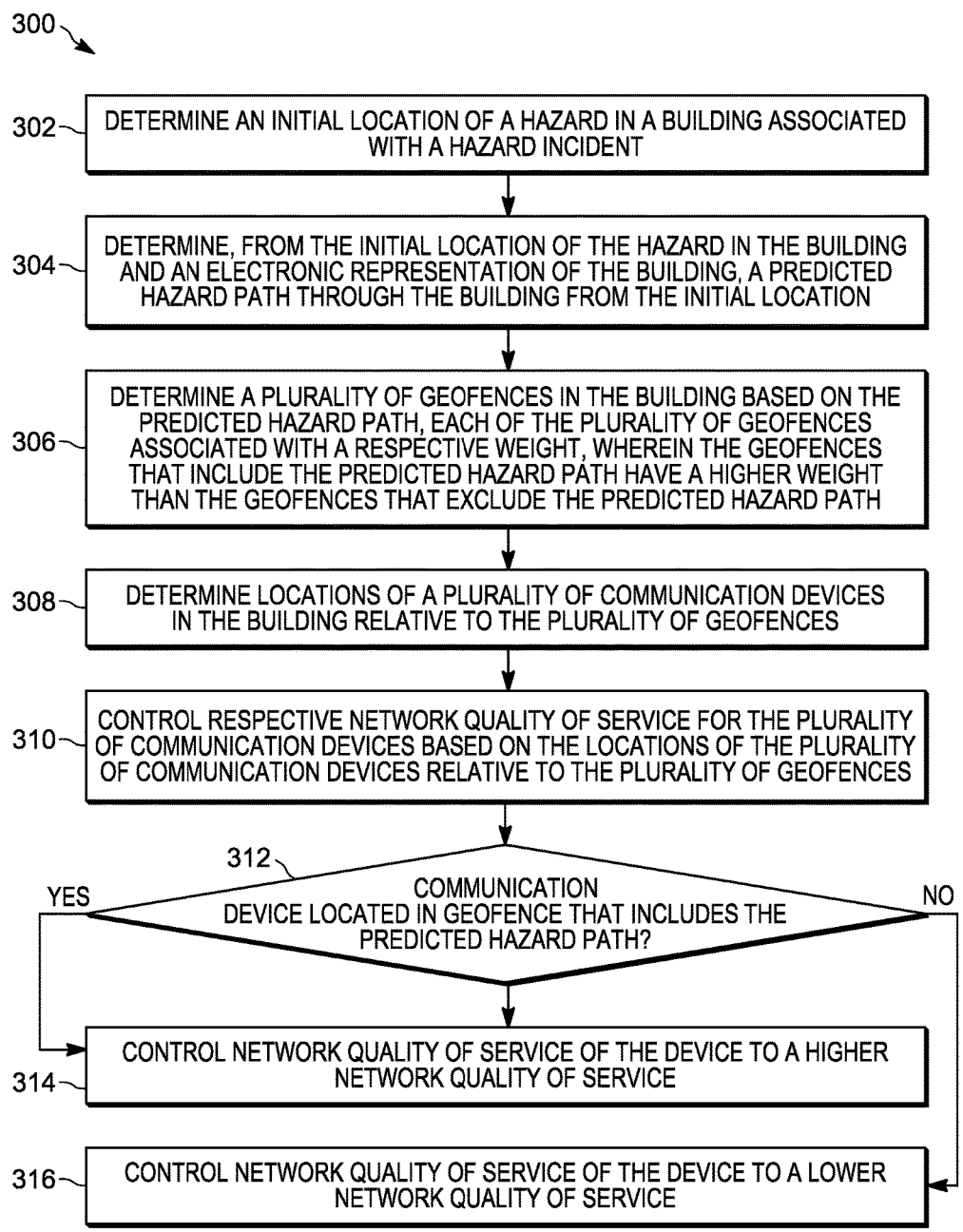
FIG. 3 is a flowchart of a method for controlling quality of service of communication devices based on a predicted hazard path in accordance with some embodiments.

Attention is now directed to FIG. 3 which depicts a flowchart representative of a method 300 for controlling quality of service of communication devices based on a predicted hazard path. The operations of the method 300 of FIG. 3 correspond to machine readable instructions that are executed by, for example, the computing device 101, and specifically by the controller 220 of the computing device 101. In the illustrated example, the instructions represented by the blocks of FIG. 3 are stored at the memory 222, for example, as the application 223. The method 300 of FIG. 3 is one way in which the controller 220 and/or the computing device 101 and/or the system 100 is configured. Furthermore, the following discussion of the method 300 of FIG. 3 will lead to a further understanding of the computing device 101 and/or the system 100, and their various components. However, it is to be understood that the computing device 101 and/or the method 300 and/or the system 100 may be varied, and need not work exactly as discussed herein in conjunction with each other, and that such variations are within the scope of present embodiments.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the computing device 101 of FIG. 1, as well.

At a block 302, the controller 220 determines an initial location 111 of a hazard (e.g. the fire 109) in a building 107 associated with a hazard incident.

At a block 304, the controller 220 determines from the initial location 111 of the hazard in the building 107 and the electronic representation 227 of the building 107, a predicted hazard path through the building 107 from the initial location 111, At a block 306, the controller 220 determines a plurality of geofences in the building 107 based on the predicted hazard path, each of the plurality of geofences associated with a respective weight, wherein the geofences that include the predicted hazard path have a higher weight than the geofences that exclude the predicted hazard path.

At a block 308, the controller 220 determines locations of a plurality of communication devices 113, 115 in the building 107, relative to the plurality of geofences.

At a block 310, the controller 220 controls (e.g. by the controller 220 communicating with at least one network communication infrastructure device 103) respective network quality of service for the plurality of communication devices 113, 115 based on the locations of the plurality of communication devices 113, relative to the plurality of geofences, such that a first communication device 113, 115 located in a first geofence that includes the predicted hazard path receives better network quality of service than a second communication device 113, 115 located in a second geofence that excludes the predicted hazard path, the second geofence having a lower weight than the first geofence.

For example, for each of the communication devices 113, 115, at a block 312, the controller 220 determines whether a communication device 113, 115 is located in a geofence that includes the predicted hazard path. When a communication device 113, 115 is located in a geofence that includes the predicted hazard path (e.g. a "YES" decision at the block 312), at a block 314, the controller 220 controls the network quality of service to a higher network quality of service.

However, when a communication device 113, 115 is located in a geofence that excludes the predicted hazard path (e.g. a "NO" decision at the block 312), at a block 316, the controller 220 controls the network quality of service to a lower network quality of service.

While the terms "higher" and "lower" are relative, when used herein with respect to network quality of service, the network quality of service are understood by higher, and lower relative to each other. For example, the network quality of service to which a communication device 113, 115 is controlled at the block 314 is higher than the network quality of service to which a communication device 113, 115 is controlled at the block 316. Hence, for example, a communication device 113, 115 located in the predicted path of the fire 109 is provided with a higher network quality of service, such as a higher bandwidth, than a communication device 113, 115 not located in the predicted path of the fire 109.

The control of the network quality of service to which each of the devices 113, 115 are controlled, and/or the weightings of the geofences, may further depend on whether a geofence in which they are located includes or excludes one or more of: an escape path that exists relative to the predicted hazard path; a region of predicted lost connectivity; a region surrounded by the predicted hazard path; explosive material predicted to be reached by the predicted hazard path; people ranked by priority; and first responders ranked by priority. Furthermore, such factors, including the predicted hazard path, may further be time dependent.

The method 300 will now be described with respect to FIG. 4 to FIG. 10, each of which are similar to FIG. 2, with like elements having like numbers. In each of FIG. 4 to FIG. 10, the controller 220 is executing the application 223.

Figure 4:
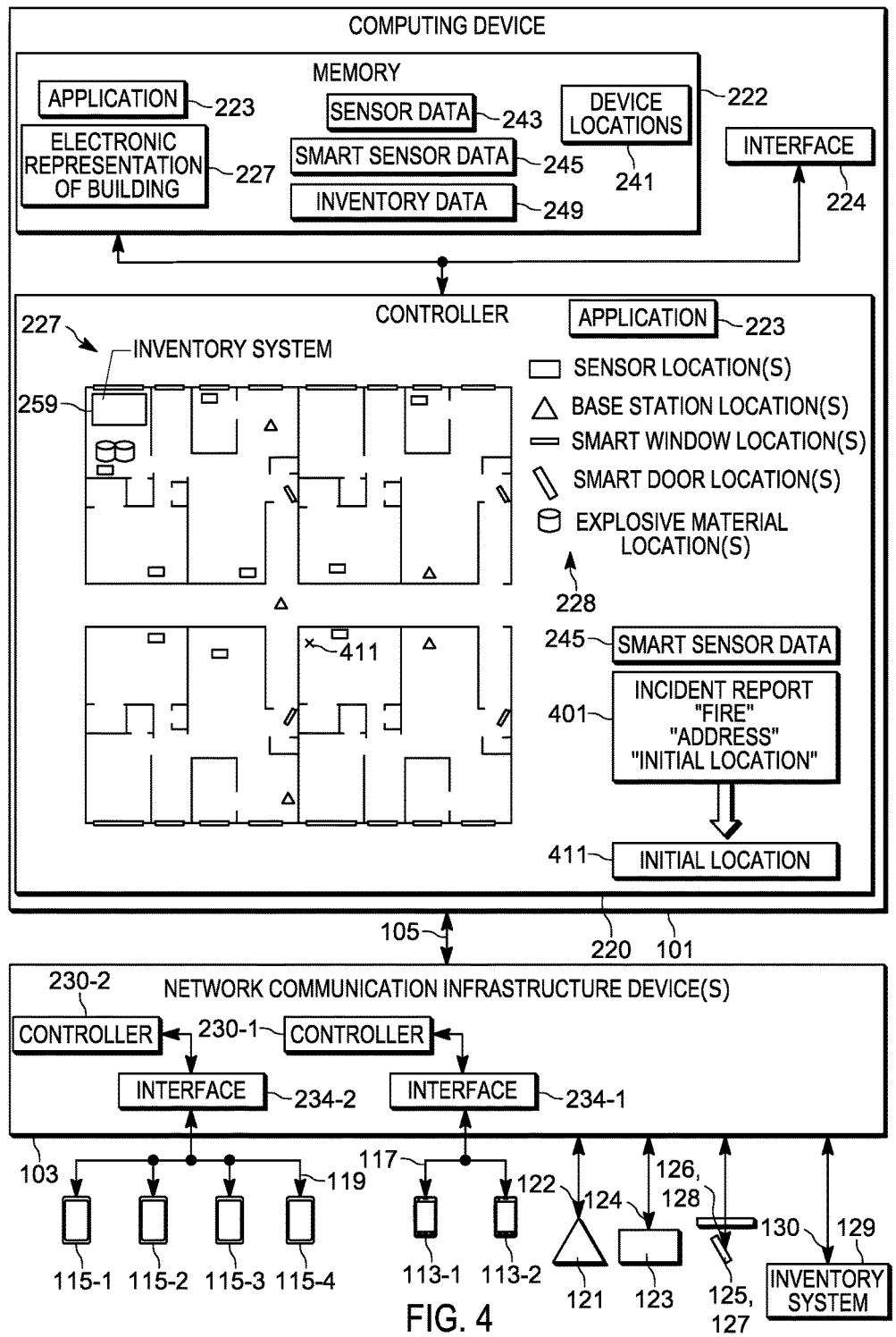
FIG. 4 depicts the computing device determining an initial location of a hazard in accordance with some embodiments.

Attention is directed to FIG. 4 which depicts an example embodiment of the block 302 of the method 300.

Specifically, the controller 220 has received an incident report 401 in which an initial location 411 of a hazard, such as the fire 109, is reported, as well as an address of the building 107 at which the hazard is occurring, and incident type associated with the hazard, as depicted a "Fire". Such an incident report 401 may be received from a 911 call center, and the like and/or such an incident report 401 may be received from a dispatcher terminal (not depicted) in communication with the computing device 101. Hence, in these embodiments, the controller 220 determines the initial location 411 of the hazard from the incident report 401.

Alternatively, and also depicted in FIG. 4, the controller 220 may determine the initial location 411 of the hazard via the sensor data 243; for example, when the hazard comprises the fire 109, the sensor data 243 may indicate detected smoke and/or detected heat at a sensor 123 located proximal to the initial location 411 of the fire 109. As each set of sensor data 243 is generally associated with the location of a respective sensor 123, the controller 220 may determine the initial location 411 of the hazard from the associated location of the sensor 123 which generates the sensor data 243 that indicates that the hazard has been detected.

FIG. 4 further depicts that the representation 227 and the guide 228 have been updated based on the inventory data 249. In particular, the location of the explosive materials 131 in the building 107 may be reported to the computing device 101 by the inventory system 129 as the explosive materials 131 are stored in the building 107 and/or logged into the inventory system 129. Hence, as depicted, the representation 227 has been updated to include a location 259 of the inventory system 129 in the building 107. Specifically, the representation 227 shows the location of the explosive materials 131 by way of a physical shape of the explosive materials 131 located in the representation 227 at a position corresponding to the location of the explosive materials 131 in the building 107. The guide 228 has been updated to include a physical shape corresponding to the explosive materials 131, as located in the representation 227.

Figure 5:
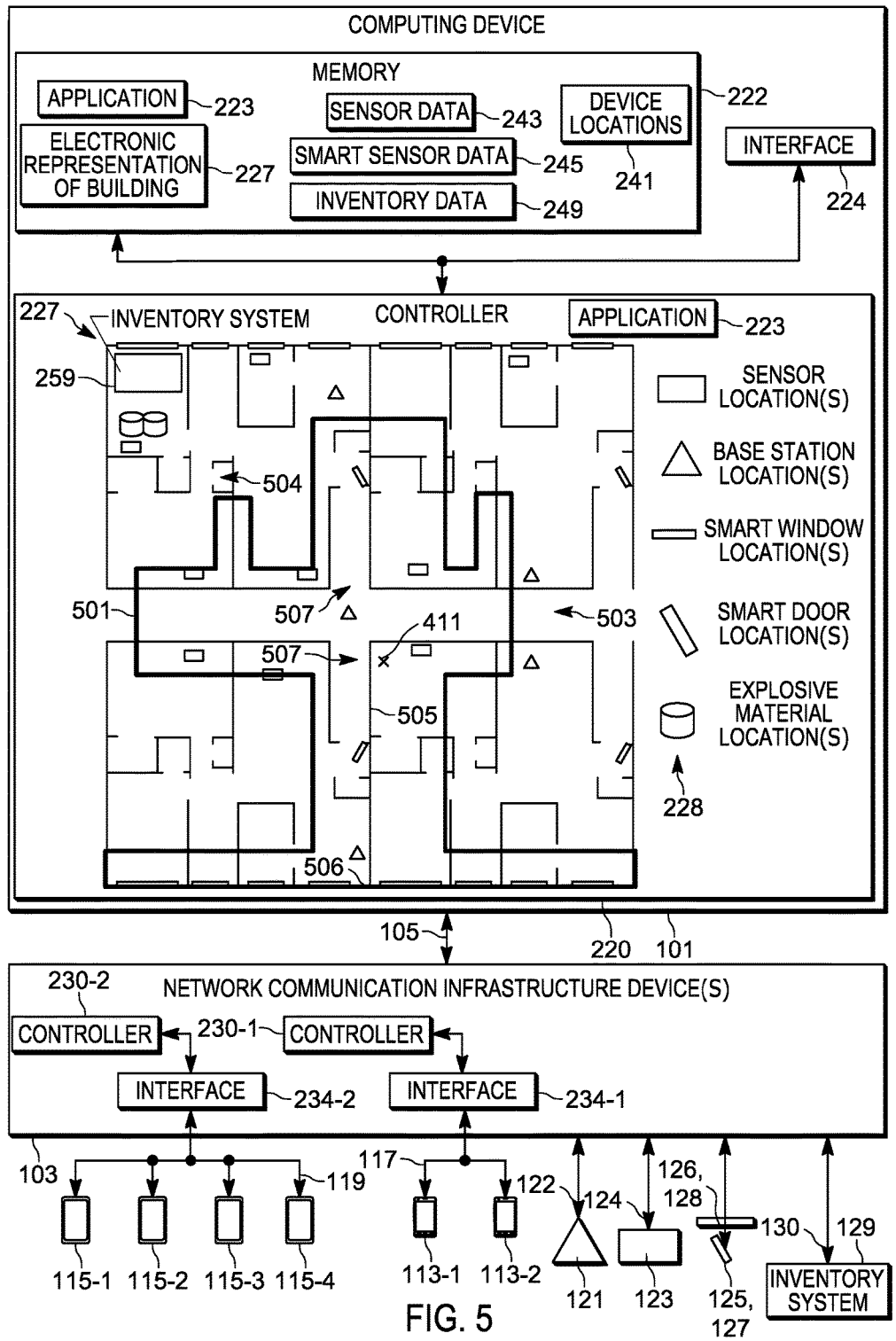
FIG. 5 depicts the computing device determining a predicted hazard path in accordance with some embodiments.

Attention is next directed to FIG. 5, which depicts an example embodiment of the block 304 of the method 300. In particular, the controller 220 determines, from the initial location 411 of the hazard in the building 107, and the electronic representation 227 of the building 107, a predicted hazard path 501 through the building 107 from the initial location 411. For example, the controller 220 may use any suitable algorithm and/or algorithms for determining the predicted hazard path 501 including, but not limited to, generalized linear regression algorithms, random forest algorithms, support vector machine algorithms, gradient boosting regressor algorithms, neural network algorithms, deep learning algorithms, evolutionary programming algorithms, and the like. Such algorithms may be components of the application 223 and/or stored as separate components in the memory 222. Such algorithms may also rely on a rule database, and the like, (e.g. which may also be a component of the application 223) which provide indications of behavior of a hazard when given conditions occur. For example, when the hazard comprises the fire 109, the rule database may indicate that a fire is likely to follow paths defined by hallways, stairwells, entrances and/or exits, electrical conduits, ventilation systems, and/or materials thereof, and/or paths of walls and/or be impeded by areas of moisture, etc. When the hazard comprises a chemical hazard, an environmental hazard, a terrorist hazard and the like, the rule database may indicate that the hazard is likely to follow defined by hallways, stairwells, entrances and/or exits, electrical conduits, ventilation systems and be impeded by walls, etc.

Furthermore, the controller 220 may further determine the predicted hazard path 501 through the building 107 from the initial location 111 based on one or more of: a communication infrastructure of the building 107; moisture levels of areas of the building 107; the inventory data 249 received from an inventory location system 259 of the building 107; the sensor data 243 received from the sensors 123 in the building 107; and the smart sensor data 245 received from a smart building infrastructure of the building 107.

For example, with respect to communication infrastructure of the building 107 the controller 220 may determine paths of electrical conduits, and the like, that a fire 109 is likely to follow in the building 107 and/or whether base stations 121 are operational, which may indicate whether or not the fire 109 has reached the location of base station 121. With respect to moisture levels of areas of the building 107, the controller 220 may determine such moisture levels from the sensor data 243 and/or determine, from the representation 227, locations of bathrooms, kitchens, and the like, where moisture is likely to occur, which may impede the fire 109. With respect to the inventory data 249, the controller 220 may determine locations of the explosive material 131 from the inventory data 249, which may accelerate the fire 109. With respect to the sensor data 243 received from the sensors 123 in the building 107, the controller 220 may determine from the sensor data 243 a location and intensity of the fire 109 at a location of a sensor 123, which may indicate a direction of travel of the fire 109. With respect to the smart sensor data 245, the controller 220 may determine whether smart windows 125 and/or smart doors 127 are open or closed; open smart windows 125 and/or smart doors 127 may accelerate the fire 109 due to oxygen being received at the fire 109 through the open smart windows 125 and/or smart doors 127, while closed smart windows 125 and/or smart doors 127 may impede the fire 109.

The predicted hazard path 501 may also be determined from the sensor data 243 which may include, but is not limited to, temperature data, heat data, gas data, ventilation data, weather data, wind flow data, smoke data, fire location data, fire severity data (e.g. a temperature of a fire indicating severity), hazard location data, hazard severity data, video data and audio data. The video data and audio data may be analyzed by the controller 220 (e.g. using associated video and/or audio analytics) to determine a severity of the hazard and/or a direction of travel by the hazard.

Furthermore, the controller 220 may further determine the predicted hazard path 501 for a given time period, for example for a ten-minute period from first determining the initial location 411. In other words, the predicted hazard path 501 may represent a position of the fire 109 ten minutes after determining the initial location 411.

As depicted in FIG. 5, the controller 220 has determined that the fire 109 will follow a passageway 503 of the building 107, be impeded by a bathroom 504 of the building 107, follow an internal wall 505 of the building 107 (e.g. due to its materials, and then an external wall 506 of the building 107 (e.g. due to their respective materials, and/or due to one or more smart windows 125 along the external wall 506 being open, thus accelerating the fire 109 by supplying oxygen to the fire 109 from air through the smart windows 125), as well as travel through entrances/exits 507 (e.g. as all the smart doors 127 are open).

Figure 6:
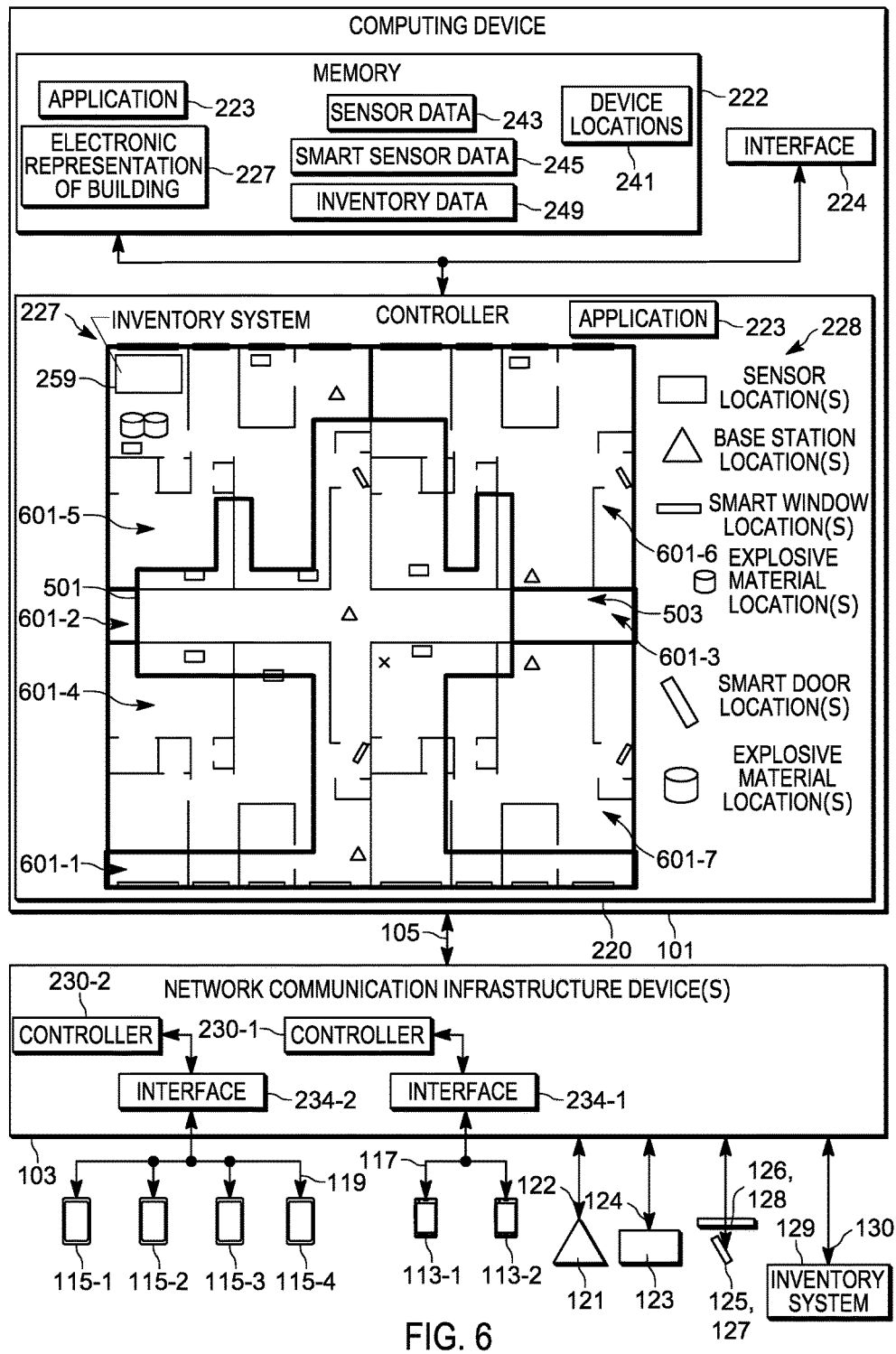
FIG. 6 depicts the computing device determining geofences in accordance with some embodiments.

Attention is next directed to FIG. 6 which depicts an example embodiment of a portion of the block 306 of the method 300. In particular, the controller 220 has determined a plurality of geofences 601-1, 601-2, 601-3, 601-4, 601-5, 601-6, 601-7 in the building 107, based on the predicted hazard path 501. The plurality of geofences 601-1, 601-2, 601-3, 601-4, 601-5, 601-6, 601-7 will be interchangeably referred to hereafter, collectively, as the geofences 601 and, generically, as a geofence 601. The geofences 601 are depicted in FIG. 6 as regions overlaid onto the representation 227. Furthermore, as the electronic representation 227 of the building 107 is two-dimensional, each of the plurality of geofences 601 is also two-dimensional. However, when the electronic representation 227 of the building 107 is three-dimensional, each of the plurality of geofences 601 is also three-dimensional, such that a geofence 601 may extend through floors of the building 107, up staircases, along conduits, through ventilation systems, and the like.

As depicted the geofence 601-1 corresponds to the predicted hazard path 501 (e.g. within a given time period). The geofences 601-2, 601-3 correspond to portions of the passageway 503 of the building 107 (each of which includes an exit), that excludes the predicted hazard path 501 (e.g. within a given time period). The geofences 601-4, 601-5, 601-6, 601-7 each correspond to portions of different units of the building 107 that exclude the predicted hazard path 501 (e.g. within a given time period), but which include one or more possible exits, such as the smart windows 125 and/or the smart doors 127.

As depicted, the exits may be predicted to be blocked by the predicted hazard path 501 within the given time period. For example, all exits of the unit corresponding to the geofence 601-4 are blocked by the predicted hazard path 501; windows of the unit corresponding to the geofence 601-5 that includes the explosive material 131 are not blocked by the predicted hazard path 501, but a door of the unit is blocked by the predicted hazard path 501; neither windows nor the door of the unit corresponding to the geofence 601-6 are blocked by the predicted hazard path 501; and the door of the unit corresponding to the geofence 601-7 is not blocked by the predicted hazard path 501, but the windows are blocked by the predicted hazard path 501.

Figure 7:
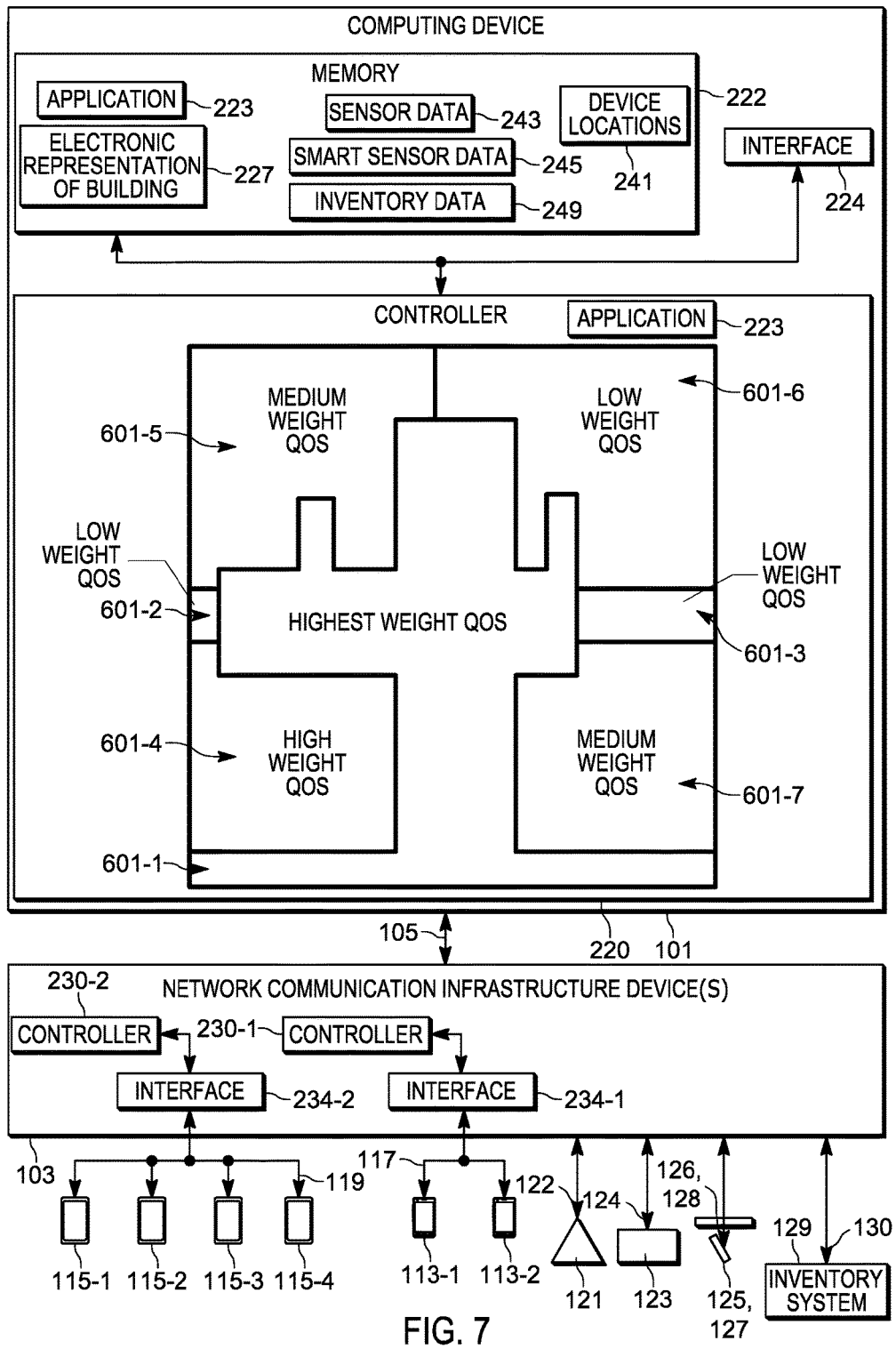
FIG. 7 depicts the computing device determining weights for the geofences in accordance with some embodiments.

Attention is next directed to FIG. 7, which depicts a further portion of the block 306 of the method 300. In FIG. 7, the geofences 601 are depicted without the representation 227 for clarity. In particular, the controller 220 assigns a weight to each of the geofences 601, in which the geofences 601 that include the predicted hazard path 501 have a higher weight than the geofences 601 that exclude the predicted hazard path 501. For example, the geofence 601-1 includes the predicted hazard path 501, the geofences 601-1 are assigned a highest weight, while the other geofences 601-2, 601-3, 601-4, 601-5, 601-6, 601-7 are assigned a lower weight.

However, the relative weight of the geofences 601-2, 601-3, 601-4, 601-5, 601-6, 601-7 may be determined using other factors, including, but not limited to, whether the predicted hazard path 501 blocks one or more exits associated with the geofences 601-2, 601-3, 601-4, 601-5, 601-6, 601-7 (e.g. whether or not the geofences 601-2, 601-3, 601-4, 601-5, 601-6, 601-7 include or exclude an escape path). Indeed, the relative weights of the geofences 601 may also be determined based on a rules database and/or one or more algorithms, similar to the algorithms used to determine the predicted hazard path 501.

For example, as the predicted hazard path 501 does not block exits associated with the geofences 601-2, 601-3, 601-6, the geofences 601-2, 601-3, 601-6 are assigned a lowest weight; put another way, each of the geofences 601-2, 601-3, 601-6 include one or more escape paths that are will not be blocked with the given time period, and a weight (e.g. a relatively low weight and/or a low value weight) is assigned accordingly. As the predicted hazard path 501 blocks some (e.g. a door), but not all (e.g. the windows) of the exits associated with the geofence 601-5, the geofence 601-5 is assigned a medium weight; put another way, the geofence 601-5 includes an escape path that will not be blocked with the given time period, and a weight (e.g. a relatively "medium" weight and/or a medium value weight) is assigned accordingly. As the predicted hazard path 501 blocks some (e.g. the windows), but not all (e.g. a door) of the exits associated with the geofence 601-7, the geofence 601-7 is also assigned a medium weight; put another way, the geofence 601-7 includes an escape path that will not be blocked with the given time period, and a medium weight is assigned accordingly. As the predicted hazard path 501 blocks all of the exits associated with the geofence 601-4, the geofence 601-4 is assigned a high weight; put another way, any escape paths associated with the geofence 601-4 are predicted to be blocked within the given time period, and a weight (e.g. a relatively "high" weight and/or a high value weight) is assigned accordingly.

Hence, for example the weight of the geofence 601-1 is the "highest" weight; the "high" weight of the geofence 601-4 is the next highest, and lower than the "highest" weight of the geofence 601-1; the "medium" weight of the geofences 601-5, 601-7 is lower than the "high" weight of the geofence 601-4, but higher than the "low" weight of the remaining geofences 601-2, 601-2, 601-6, which have the lower weight. While the terms "highest", "high", "medium" and "low" are relative, when used herein with respect to weights, the weights are understood by high, low, and the like, relative to each other.

Indeed, the controller 220 may be configured to determine the respective weight of each of the plurality of geofences 601 based on one or more of each of the plurality of geofences 601 including or excluding (e.g. within a given time period), the predicted hazard path 501, and one or more of: an escape path that exists relative to the predicted hazard path 501; a region of predicted lost connectivity; a region surrounded by the predicted hazard path 501; explosive material 131 predicted to be reached by the predicted hazard path 501; people ranked by priority; and first responders ranked by priority.

With regards to regions of predicted lost connectivity, the controller 220 may be further configured to determine base stations 121 located in the predicted hazard path 501 which are hence predicted to be damaged by the hazard, thereby producing regions of lost connectivity (which may include geofences 601 that exclude the predicted hazard path 501). A weight of the geofences 601 is adjusted based on inclusion, or exclusion of such regions.

With regards to regions surrounded by the predicted hazard path 501, the controller 220 may be further configured to determine geofences 601 that include such regions (such as the geofence 601-4), and adjust the weight accordingly.

With regards to geofences 601 that include the explosive material 131 predicted to be reached by the predicted hazard path, the controller 220 may be further configured to determine geofences 601 that include such explosive material 131 (such as the geofence 601-5), and adjust the weight accordingly, depending on when the predicted hazard path 501 is determined to reach the explosive material 131.

Assuming that the controller 220 has implemented the block 308 of the method 300 (described below), and further has access to a mapping, and the like, of first responders and/or people associated with the devices 113, 115, the controller 220 may also determine a weight of a geofence 601 based on the presence, or absence, of first responders and/or people located in a geofence 601, as ranked by priority. For example, a geofence 601 that includes a device 113 of a fire chief may be adjusted to a higher weight, relative to a geofence 601 that includes a device 113 of a junior firefighter. People operating the commercial and/or business devices 115 may be similarly ranked and geofences 601 adjusted accordingly.

Indeed, the controller 220 may be further configured to adjust the weights of the geofences 601 based on a plurality of such factors, with some factors being given a higher priority than other factors. In particular, geofences 601 that exclude an escape path may be determined to be the most important factor for determining weight after the geofences 601 including or excluding the predicted hazard path 501.

Figure 8:
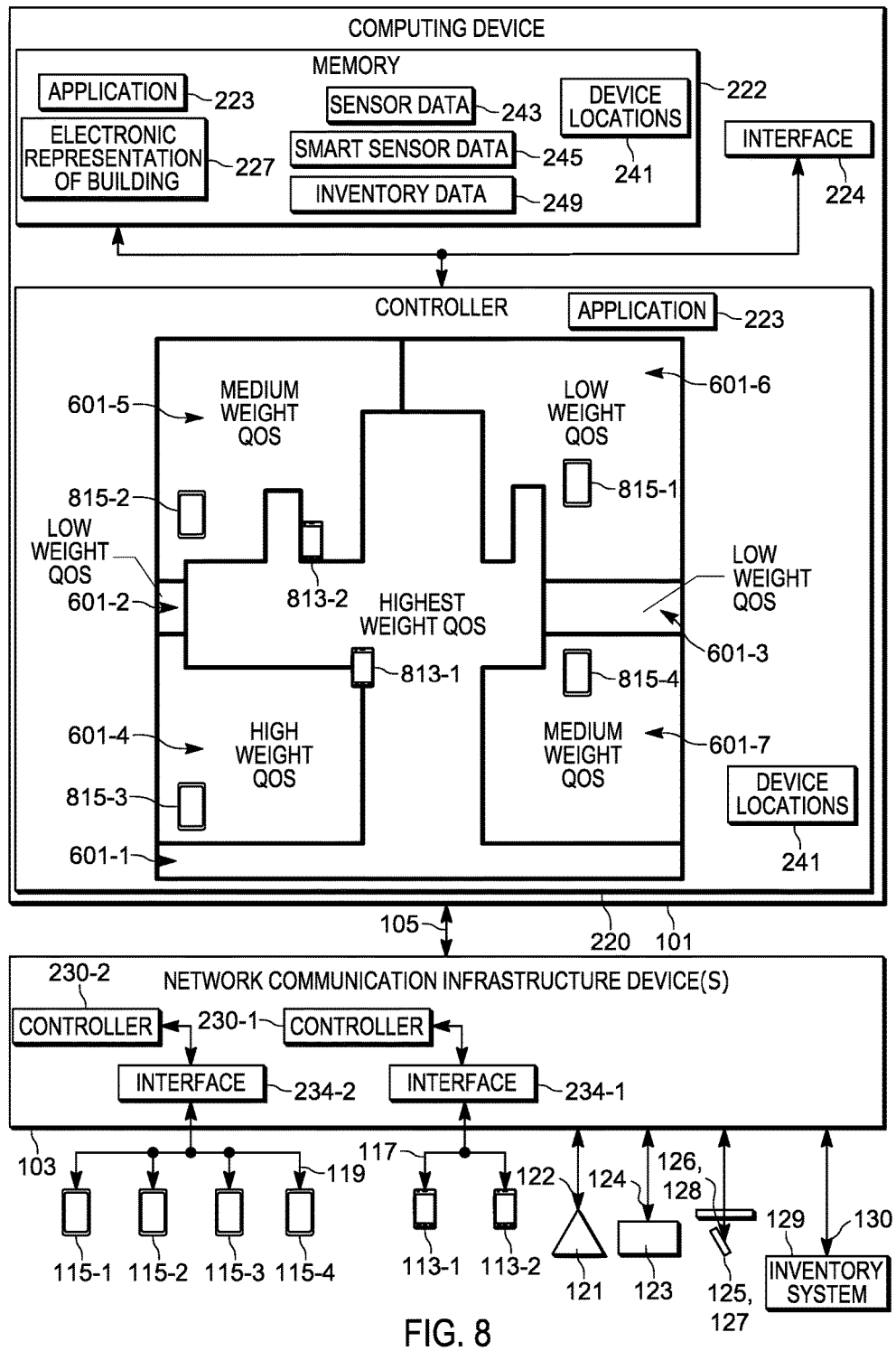
FIG. 8 depicts the computing device determining locations of communication devices relative to the geofences in accordance with some embodiments.

Attention is next directed to FIG. 8 which depicts an example embodiment of the block 308 of the method 300. In particular, the controller 220 has determined the respective locations 813-1, 813-2, 815-1, 815-2, 815-3, 815-4, of the plurality of communication devices 113-1, 113-2, 115-1, 115-2, 115-3, 115-4 in the building 107, relative to the plurality of geofences 601. The locations 813-1, 813-2 will be interchangeably referred to hereafter, collectively, as the locations 813 and, generically, as a location 813; similarly, the locations 815-1, 815-2, 815-3, 815-4 will be interchangeably referred to hereafter, collectively, as the locations 815 and, generically, as a location 815. In particular, the controller 220 has determined the locations 813, 815 from the device locations 241.

In embodiments, where one or more of the device locations 241 have not yet been received, and/or are older than a given time period (e.g. ten minutes), the controller 220 may determine the locations of the plurality of communication devices 113, 115 in the building 107 by communicating with the at least one network communication infrastructure device 103, for example to request the device locations 241 from the devices 113, 115 and/or from the base stations 121. Put another way, the controller 220 may determine the locations of the plurality of communication devices 113, 115 in the building 107 by communicating with the one or more of the plurality of communication devices 113, 115 and/or the base stations 121.

Figure 9:
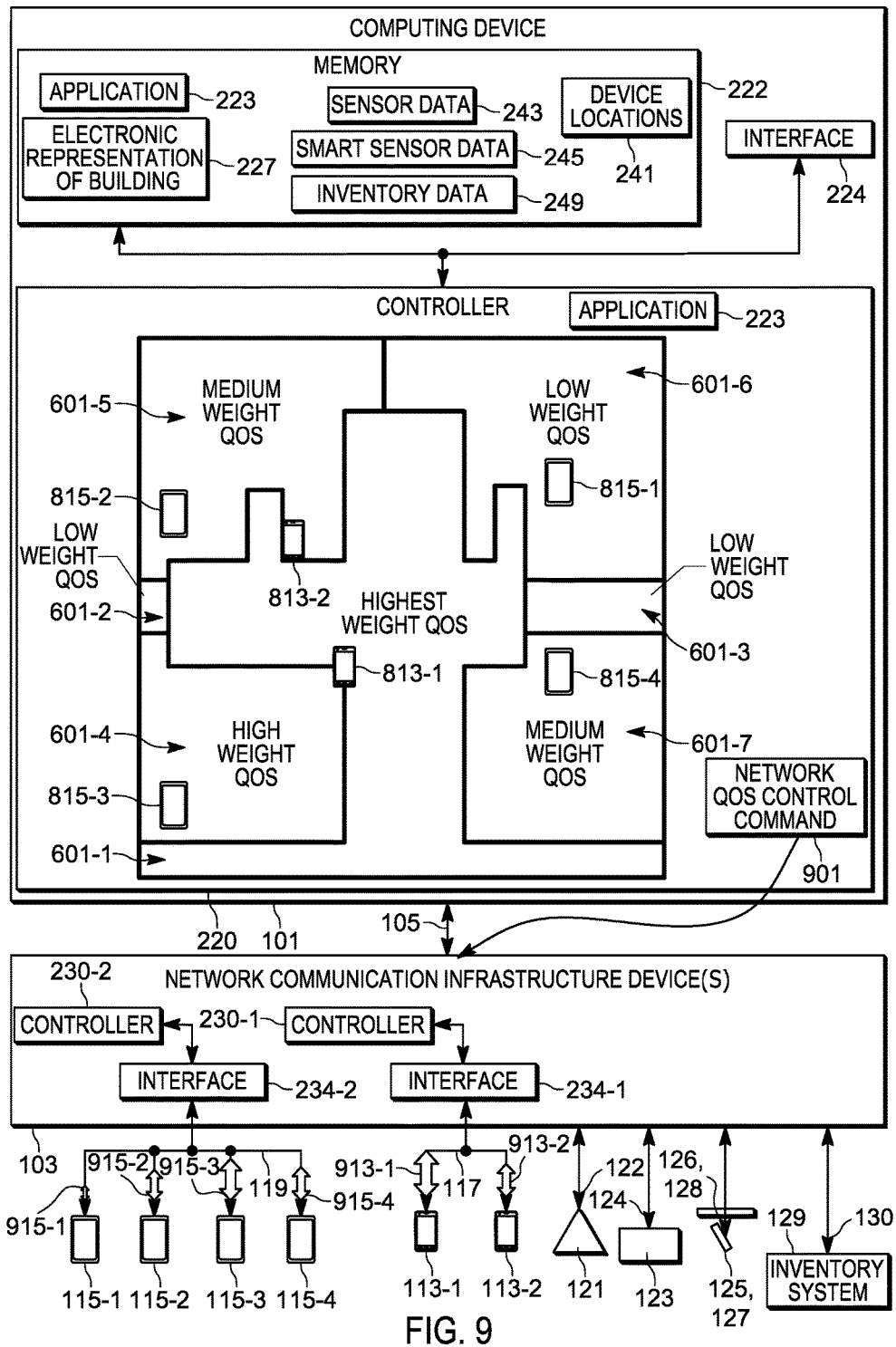
FIG. 9 depicts the computing device controlling network quality of service for the communication devices in accordance with some embodiments.

Attention is next directed to FIG. 9 which depicts an example embodiment of the blocks 310, 312, 314, 316 of the method 300. In particular, the controller 220 is transmitting one or more network quality of service control commands 901 to the at least one infrastructure device 103, via the link 105, which causes at least one infrastructure device 103 to control respective network quality of service for the plurality of communication devices 113, 115 based on the locations 813, 815 of the plurality of communication devices 113, 115 relative to the plurality of geofences 601, such that a first communication device 113, 115 located in a first geofence 601 that includes the predicted hazard path 501 receives better network quality of service than a second communication device 113, 115 located in a second geofence 601 that excludes the predicted hazard path 501, the second geofence 601 having a lower weight than the first geofence.

As depicted in FIG. 9, and as represented by a relative size of arrows 913-1, 913-2, 915-1, 915-2, 915-3, 915-4, the network quality of service of each of the devices 113, 115 is controlled on respective links 117, 119 via the respective controller 230 executing the one or more network quality of service control commands 901 to control the network quality of service of each of the devices 113, 115 via the respective interfaces 234.

For example, as the device 113-1 is located in the geofence 601-1 that includes the predicted hazard path 501, and has the highest weight, a network quality of service of the device 113-1, on a respective link 117, as represented by the arrow 913-1, is controlled to a highest and/or better value than the other devices 113-2, 115-1, 115-2, 115-3, 115-4 that are located in respective geofences 601 that exclude the predicted hazard path 501.

Similarly, as the device 115-3 is located in the geofence 601-4 that has the second highest weight, a network quality of service of the device 115-3, on a respective link 119, as represented by the arrow 915-3, is controlled to a second highest value and/or better value than the other devices 113-2, 115-1, 115-2, 115-4.

Similarly, as the devices 113-2, 115-2, 115-4 are located in geofences 601-5, 601-7 that has the third highest weight (e.g. a medium weight), a network quality of service of the devices 113-2, 115-2, 115-4, on respective links, 117 119, as represented by the arrows 913-2, 915-2, 915-4 is controlled to a third highest value and/or better value than the device 115-1.

Finally, as the device 115-1 is located in the geofence 601-6 that has the lowest weight, a network quality of service of the device 115-1, on a respective link 119, as represented by the arrow 915-1 is controlled to the lowest value.

In other words, for each of the devices 113, 115, the controller 220 determines at the block 312 whether a device 113, 115 is located in a geofence 601 that includes or excludes the predicted hazard path 501; when a device 113, 115 is located in a geofence 601 that includes the predicted hazard path 501, the device 113, 115 is controlled to a higher quality of service (at the block 314), and when a device 113, 115 is located in a geofence 601 that excludes the predicted hazard path 501, the device 113, 115 is controlled to a lower quality of service (at the block 316). Hence, devices 113, 115 that are in imminent danger from the hazard are given a better network quality of service than devices 113, 115 that are not in imminent danger; hence the devices 113, 115 that are in imminent danger from the hazard are less subject to communication issues that may result due to traffic congestion during the hazard.

The network quality of service of the devices 113 may also be controlled differently from the network quality of service of the devices 115. For example, the devices 113 of the responders may be controlled to a better quality of service than devices 115 of consumers and the like. For example, as depicted in FIG. 9, the device 113-2 has been controlled to the same quality of service as the devices 115-2, 115-4 as each are located in geofences 601 having equal weight; however, in other embodiments, the device 113-2 may be controlled to a better and/or higher quality of service as the devices 115-2, 115-4 when each are located in geofences 601 having equal weight, to give network priority to a device 113-2 of a responder.

The controller 220 may periodically repeat the method 300, for example to update one or more of a respective weight, a respective location, a respective size and a respective geometry of one or more of the plurality of geofences 601 based on an updated hazard fire path, and responsively update and/or control the respective network quality of service for the plurality of communication devices 113, 115, accordingly. Similarly, the controller 220 may update the locations of the plurality of communication devices 113, 115 and responsively update and/or control the respective network quality of service for the plurality of communication devices 113. 115, accordingly (for example, when a device 113, 115 crosses from one geofence 601 to another geofence 601 of different weight). Such updating may occur periodically and/or when the sensor data 243 indicates that a hazard has reached the predicted hazard path 501; indeed, it is assumed that the sensors 123 continue to transmit the sensor data 243 after the determination of the initial location 411 of the hazard.

Figure 10:
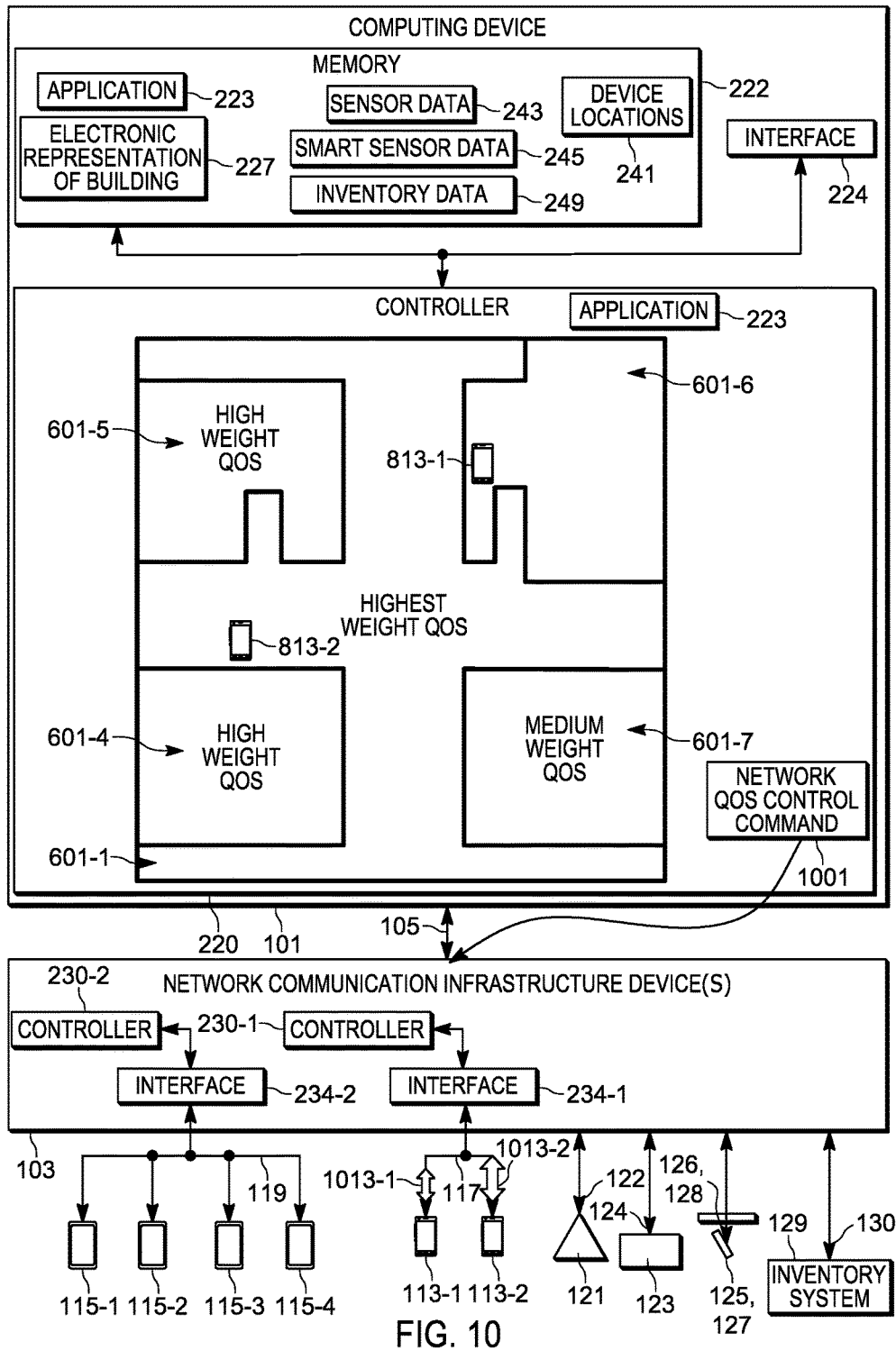
FIG. 10 depicts the computing device updating the network quality of service for the communication devices based on an updated predicted hazard path and/or updated locations of the communication devices in accordance with some embodiments.

For example, attention is next directed to FIG. 10, which depicts updated geofences 601. In particular, it is assumed in FIG. 10 that the controller 220 has again determined a predicted hazard path, for example after a given time period after the determination of the previous predicted hazard path 501 and/or according to given periodicity and/or when the sensor data 243 indicates that a hazard has reached the predicted hazard path 501. While the updated hazard path is not depicted, it is assumed to coincide with the updated geofence 601-1. In other words, a size, location and geometry of the geofence 601-1 has changed in FIG. 10, relative to the size, location and geometry of the geofence 601-1 depicted in FIG. 9. Similarly, the size, location and geometry of the geofences 601-4, 601-5, 601-6, 601-7 have changed. Furthermore, a weight of the geofences 601-5, 601-7 have changed from a medium weight to a high weight, as it is assumed that the updated predicted hazard path will eliminate escape paths from the geofences 601-5, 601-7. Furthermore, the geofence 601-5 may be adjusted to have a higher weight than geofence 601-7 as the geofence 601-5 is now inclusive of the explosive material 131. Similarly, a weight of the geofence 601-6 has changed from a low weight to a medium weight, as it is assumed that the updated predicted hazard path will reduce a number of escape path from two escape paths to one escape path (e.g. only of a portion of windows associated with the geofence 601-6 may be available for escape, while a door is blocked).

Furthermore, the geofences 601-2, 601-3 are no longer present as they have been absorbed by the geofence 601-1.

In addition, the devices 115 are no longer present in the building 107, while a location of the devices 113 have changed in the building 107. For example, the device 113-1 is now located in the geofence 601-6 having a medium weight, and the device 113-2 is located in the geofence 601-1 having the highest weight. As such, the controller 220 transmits another network quality of service control command 1001 to the at least one infrastructure device 103, which causes the at least one infrastructure device 103 to adjust the respective quality of service for the devices 113 accordingly, as represented by arrows 1013-1, 1013-2. For example, the network quality of service for the device 113-1 is decreased, and the network quality of service for the device 113-2 is increased. As the devices 115 are no longer located in the building 107, the controller 220 may stop controlling their network quality of service.

Provided herein is a device, system and method for controlling quality of service of communication devices based on a predicted hazard path. The quality of service of the communication devices is controlled based on whether a geofence in which a communication device is located includes, or excludes, a predicted hazard path, as well as various other factors. In this manner, communication devices that are located in regions where danger of injury by the hazard may be imminent are provided with better quality of service than communication devices where danger of injury by the hazard may be less imminent.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method comprising:
    determining, at a controller of a computing device, an initial location of a hazard in a building associated with a hazard incident;
    determining, at the controller, from the initial location of the hazard in the building and an electronic representation of the building, a predicted hazard path through the building from the initial location based on one or more of: moisture levels of areas of the building; inventory data received from an inventory location system of the building; temperature data, heat data; gas data; ventilation data; weather data; wind flow data; smoke data; fire location data; fire severity data; hazard severity data; video data from the building; and audio data from the building;
    determining, at the controller, a plurality of geofences in the building based on the predicted hazard path, each of the plurality of geofences associated with a respective weight, wherein the geofences that include the predicted hazard path have a higher weight than the geofences that exclude the predicted hazard path;
    updating the respective weight of each of the plurality of geofences based on one or more of: an escape path that exists relative to the predicted hazard path; a region surrounded by the predicted hazard path; explosive material predicted to be reached by the predicted hazard path; and a region where connectivity infrastructure is predicted to be damaged by the hazard;
    determining, at the controller, locations of a plurality of communication devices in the building; and,
    controlling, by the controller communicating with at least one network communication infrastructure device, respective network quality of service for the plurality of communication devices based on the locations of the plurality of communication devices in the building, relative to the plurality of geofences, such that a first communication device located in a first geofence receives better network quality of service than a second communication device located in a second geofence having a lower updated weight than the first geofence.

2. The method of claim 1, wherein the electronic representation of the building is one of a two-dimensional model, and a three-dimensional model of the building that includes a plurality of structural information, the structural information comprising one or more of building architectural info, building type, building material type and associated location, building unit type, and building structure type, and each of the plurality of geofences is correspondingly one of two-dimensional and three-dimensional.

3. The method of claim 1, further comprising: determining, at the controller, the predicted hazard path through the building from the initial location further based on one or more of: a communication infrastructure of the building; sensor data received from sensors in the building; and smart sensor data received from a smart building infrastructure of the building.

4. The method of claim 1, wherein updating the respective weight of each of the plurality of geofences is further based on one or more of:
    a region of predicted lost connectivity;
    people ranked by priority; and
    first responders ranked by priority.

5. The method of claim 1, wherein the hazard comprises one or more of a: a fire hazard; a chemical hazard; a biological hazard; a radiological hazard; a nuclear hazard; an environmental hazard; and a terrorist hazard.

6. The method of claim 1, further comprising: determining, at the controller, the locations of the plurality of communication devices in the building by communicating with the at least one network communication infrastructure device.

7. The method of claim 1, further comprising: determining, at the controller, the locations of the plurality of communication devices in the building by communicating with the one or more of the plurality of communication devices.

8. The method of claim 1, wherein the at least one network communication infrastructure device comprises one or more of: a first responder network communication infrastructure device; a Project 25 network communication infrastructure device; a cell phone network communication infrastructure device; and WiFi network communication infrastructure device.

9. The method of claim 1, further comprising:
updating one or more of the respective weight, a respective location, a respective size and a respective geometry of one or more of the plurality of geofences based on an updated hazard path; and
controlling, by the controller communicating with the at least one network communication infrastructure device, the respective network quality of service for the plurality of communication devices based on one or more of updated respective weights, updated respective locations, updated respective sizes and updated respective geometry of the plurality of geofences.

10. The method of claim 1, further comprising:
updating the locations of the plurality of communication devices; and
controlling, by the controller communicating with the at least one network communication infrastructure device, the respective network quality of service for the plurality of communication devices based on updated locations of one or more of the plurality of communication devices.

11. A device comprising:
a controller, and a communication interface configured to communicate with at least one network communication infrastructure device, the controller configured to:
determine an initial location of a hazard in a building associated with a hazard incident;
determine, from the initial location of the hazard in the building and an electronic representation of the building, a predicted hazard path through the building from the initial location based on one or more of: moisture levels of areas of the building; inventory data received from an inventory location system of the building; temperature data, heat data; gas data; ventilation data; weather data; wind flow data; smoke data; fire location data; fire severity data; hazard severity data; video data from the building; and audio data from the building;
determine a plurality of geofences in the building based on the predicted hazard path, each of the plurality of geofences associated with a respective weight, wherein the geofences that include the predicted hazard path have a higher weight than the geofences that exclude the predicted hazard path;
update the respective weight of each of the plurality of geofences based on one or more of: an escape path that exists relative to the predicted hazard path; a region surrounded by the predicted hazard path; explosive material predicted to be reached by the predicted hazard path; and a region where connectivity infrastructure is predicted to be damaged by the hazard;
determine locations of a plurality of communication devices in the building; and,
control, via the communication interface communicating with the at least one network communication infrastructure device, respective network quality of service for the plurality of communication devices based on the locations of the plurality of communication devices in the building, relative to the plurality of geofences, such that a first communication device located in a first geofence receives better network quality of service than a second communication device located in a second geofence having a lower updated weight than the first geofence.

12. The device of claim 11, wherein the electronic representation of the building is one of a two-dimensional model, and a three-dimensional model of the building that includes a plurality of structural information, the structural information comprising one or more of building architectural info, building type, building material type and associated location, building unit type, and building structure type, and each of the plurality of geofences is correspondingly one of two-dimensional and three-dimensional.

13. The device of claim 11, wherein the controller is further configured to:
determine the predicted hazard path through the building from the initial location further based on one or more of: a communication infrastructure of the building; sensor data received from sensors in the building; and smart sensor data received from a smart building infrastructure of the building.

14. The device of claim 11, wherein the controller is further configured to update the respective weight of each of the plurality of geofences further based on one or more of:
a region of predicted lost connectivity;
people ranked by priority; and
first responders ranked by priority.

15. The device of claim 11, wherein the hazard comprises one or more of a: a fire hazard; a chemical hazard; a biological hazard; a radiological hazard; a nuclear hazard; an environmental hazard; and a terrorist hazard.

16. The device of claim 11, wherein the controller is further configured to:
determine the locations of the plurality of communication devices in the building by communicating with the at least one network communication infrastructure device.

17. The device of claim 11, wherein the controller is further configured to:
determine the locations of the plurality of communication devices in the building by communicating with the one or more of the plurality of communication devices.

18. The device of claim 11, wherein the at least one network communication infrastructure device comprises one or more of: a first responder network communication infrastructure device; a Project 25 network communication infrastructure device; a cell phone network communication infrastructure device; and WiFi network communication infrastructure device.

19. The device of claim 11, wherein the controller is further configured to:
update one or more of the respective weight, a respective location, a respective size and a respective geometry of one or more of the plurality of geofences based on an updated hazard path; and control, by the communication interface communicating with the at least one network communication infrastructure device, the respective network quality of service for the plurality of communication devices based on one or more of updated respective weights, updated respective locations, updated respective sizes and updated respective geometry of the plurality of geofences.

20. The device of claim 11, wherein the controller is further configured to:
update the locations of the plurality of communication devices; and control, by the communication interface communicating with the at least one network communication infrastructure device, the respective network quality of service for the plurality of communication devices based on updated locations of one or more of the plurality of communication devices.

* * * * *